United States Patent
Buguin et al.

(10) Patent No.: US 9,604,323 B2
(45) Date of Patent: Mar. 28, 2017

(54) METHOD OF FABRICATING A STEAM TURBINE DEFLECTOR

(71) Applicant: ALSTOM Technology Ltd., Baden (CH)

(72) Inventors: Arnaud Buguin, Gentilly (FR); Dominique Travers, Les Pavillon sous Bois (FR)

(73) Assignee: General Electric Technology GmbH, Baden (CH)

( * ) Notice: Subject to any disclaimer, the term of this patent is extended or adjusted under 35 U.S.C. 154(b) by 550 days.

(21) Appl. No.: 14/023,928

(22) Filed: Sep. 11, 2013

(65) Prior Publication Data

US 2014/0010643 A1 Jan. 9, 2014

Related U.S. Application Data

(63) Continuation of application No. PCT/EP2012/054172, filed on Mar. 9, 2012.

(30) Foreign Application Priority Data

Mar. 11, 2011 (FR) ...................... 11 52006

(51) Int. Cl.
- *B23K 31/02* (2006.01)
- *B23P 15/04* (2006.01)
- *B23P 15/00* (2006.01)
- *F01D 9/04* (2006.01)

(52) U.S. Cl.
CPC ............. *B23P 15/04* (2013.01); *B23P 15/006* (2013.01); *F01D 9/044* (2013.01); *B23K 2201/001* (2013.01); *F05D 2230/232* (2013.01); *Y10T 29/49316* (2015.01)

(58) Field of Classification Search
None
See application file for complete search history.

(56) References Cited

U.S. PATENT DOCUMENTS

| | | | |
|---|---|---|---|
| 1,470,506 A | 10/1923 | Steenstrup | |
| 3,839,942 A | 10/1974 | Ferchland | |
| 4,141,124 A * | 2/1979 | Ryan | B23P 6/005 29/252 |
| 4,445,259 A * | 5/1984 | Ekbom | B22F 7/08 29/889.21 |
| 6,004,102 A * | 12/1999 | Kuefner | F01D 5/286 416/196 R |

(Continued)

FOREIGN PATENT DOCUMENTS

| | | | |
|---|---|---|---|
| CH | FR 2972380 A1 * | 9/2012 | ............ B23P 15/006 |
| CN | 101035988 A | 9/2007 | |

(Continued)

*Primary Examiner* — Kiley Stoner
(74) *Attorney, Agent, or Firm* — GE Global Patent Operation; Cynthia W. Flanigan

(57) ABSTRACT

The invention relates to a method for manufacturing a steam turbine low-pressure or medium-pressure module deflector, said deflector comprising an internal ring and an external ring as well as vanes, said method comprising a step of welding said vanes to said rings. The main characteristic of a method according to the invention is that the welding step is preceded by a step of automatically machining the ends of each vane to create a peripheral recess around each of said ends.

7 Claims, 2 Drawing Sheets

(56) References Cited

U.S. PATENT DOCUMENTS

| | | | | |
|---|---|---|---|---|
| 2004/0158984 A1* | 8/2004 | Lundgren | | B23K 26/24 29/889.21 |
| 2005/0000091 A1* | 1/2005 | Ockborn | | B23K 1/0008 29/889.23 |
| 2006/0104810 A1* | 5/2006 | Hagle | | B23K 1/0018 415/210.1 |
| 2008/0112809 A1* | 5/2008 | Corral Garcia | | F01D 5/045 416/189 |
| 2009/0087316 A1* | 4/2009 | Mueller | | F01D 5/3038 416/219 R |
| 2010/0074704 A1* | 3/2010 | Rozic | | B23C 3/18 409/141 |
| 2012/0148395 A1* | 6/2012 | Werther | | F01D 9/042 415/208.1 |
| 2012/0201680 A1* | 8/2012 | Hall | | F04D 29/023 416/178 |
| 2013/0019475 A1* | 1/2013 | Ing | | B21D 53/78 29/889 |
| 2013/0156587 A1* | 6/2013 | Kubel | | F01D 5/005 416/219 R |
| 2013/0224008 A1* | 8/2013 | Cheung | | B23P 17/00 415/208.1 |
| 2013/0251472 A1* | 9/2013 | Mori | | B23C 3/12 409/132 |
| 2013/0280086 A1* | 10/2013 | Chou | | F04D 29/023 416/241 A |
| 2013/0287563 A1* | 10/2013 | Brummitt-Brown | | F01D 9/042 415/209.4 |
| 2014/0041223 A1* | 2/2014 | Wojciechowski | | F01D 5/005 29/889.1 |
| 2014/0140834 A1* | 5/2014 | Richner | | F01D 9/042 415/191 |
| 2014/0212284 A1* | 7/2014 | Jamison | | F01D 9/041 415/208.2 |
| 2014/0373556 A1* | 12/2014 | Aronsson | | F01D 25/162 60/796 |

FOREIGN PATENT DOCUMENTS

| | | | | |
|---|---|---|---|---|
| CN | 101403320 A | | 4/2009 | |
| GB | 548649 | | 10/1942 | |
| GB | 710938 A | * | 6/1954 | ............ F01D 5/147 |
| GB | 850507 A | * | 10/1960 | ............ F01D 5/225 |
| GB | 865198 A | * | 4/1961 | ............ B23P 15/006 |
| GB | 996773 | | 6/1965 | |
| GB | CH 426885 A | * | 12/1966 | ............ F01D 9/044 |
| GB | 1061327 A | * | 3/1967 | ............ F01D 9/044 |
| JP | 57005504 A | * | 1/1982 | |
| JP | S58-128404 A | | 8/1983 | |
| JP | 59206181 A | * | 11/1984 | |
| JP | 61265308 | | 11/1986 | |
| JP | 62254988 A | * | 11/1987 | |
| JP | 04094402 A | * | 3/1992 | |
| JP | 5231102 | | 9/1993 | |
| JP | H06-270006 A | | 9/1994 | |
| RU | 2173390 C2 | | 9/2001 | |
| RU | 2341660 C2 | | 12/2008 | |
| SU | 1039698 A1 | | 9/1983 | |

* cited by examiner

METHOD OF FABRICATING A STEAM TURBINE DEFLECTOR

CROSS-REFERENCE TO RELATED APPLICATIONS

This application claims priority to PCT/EP2012/054172 filed Mar. 9, 2012, which in turn claims priority to French application 1152006 filed Mar. 11, 2011, both of which are hereby incorporated in their entireties.

TECHNICAL FIELD

The subject matter of the present invention is a method of fabricating a steam turbine deflector.

BACKGROUND

A steam turbine is a rotating machine intended to convert the thermal energy of steam into mechanical energy for driving an alternator, a pump or any other rotary mechanical receiver. In most cases the turbine includes a high-pressure module, possibly a medium-pressure module, and a low-pressure module. Steam supplied by a steam generator is fed to the high-pressure module and then to the medium-pressure and low-pressure modules.

The medium-pressure and low-pressure modules generally comprise a symmetrical or non-symmetrical single or double flow internal body enclosing a rotor equipped with mobile blades and supporting fixed vanes. The fixed vanes are constituted by a succession of deflectors suspended in said internal body and interleaved between the mobile stages of the rotor, said deflectors being adapted to guide the flow of steam in a specific direction toward the mobile blades of the rotor, accelerating the steam. A deflector typically includes an internal ring and an external ring connected to each by a multiplicity of identical vanes.

In some prior art fabrication methods each of the deflectors is welded manually to the internal ring and to the external ring. To execute these welds under the best conditions, the two ends of each vane intended to be welded to the internal and external rings of the deflector are chamfered by an operator so as to produce a filling space intended to accommodate a weld bead. This space, which can be likened to a peripheral groove formed around the vane, is delimited partly by the vane and by the corresponding ring and therefore allows the deposition of a greater quantity of welding material so as to reinforce the connection between said vane and said ring.

Now, until now, these chamfers have been produced manually by an operator using a grinding tool, the quality of said chamfers being therefore greatly dependent on the operator, as much at the level of their skills as their aptitude to carry out this grinding at the time. This results in a somewhat fluctuating quality of the chamfers, which can be harmful for the deflectors produced from such vanes. In fact, experience has shown that manual grinding of such chamfers remained somewhat approximate over a large quantity of vanes processed by this manual method and could reveal serious and harmful structural defects, such as cracks along the welded joints, for example. In order to remedy this situation, deemed unacceptable for the correct operation of the turbine, the risks of malfunction or accidents proving too high, the phase of machining the ends of each vane has been automated, by means of a machine designed to produce grooves of given shape and size, one after the other, repetitively, reliably and continuously. In this way, the fabrication method of the invention contributes to greatly reducing or even eliminating all risk of defects appearing in the deflector, linked to random machining of the vanes, and therefore to welded joints of smaller size and/or lesser quality.

SUMMARY

The subject matter of the present invention is a method of fabricating a deflector of a low-pressure or medium-pressure module of a steam turbine, said deflector including an internal ring, an external ring and vanes, said method comprising a step of welding said vanes to said rings. The principal feature of a fabrication method in accordance with the invention is that the welding step is preceded by a step of automatic machining of the ends of each vane in order to produce a peripheral recess around each of said ends. In this way, automation of the machining of the vanes enables production of vanes uniform with respect to each other and provided with recesses of constant size and geometry, in contrast to manual grinding, which is necessarily random, because it correlates directly with the skills and the aptitude of an operator. Each vane is therefore machined automatically at these two ends, to be fixed by welding both to the internal ring and to the external ring.

The machining step is preferably effected by means of a machine designed to produce the recesses by removal of material. In this way, before undergoing this machining, the vanes arrive with a simple and homogeneous geometry and are then progressively hollowed out to produce recesses of given size and shape. Programming the operating parameters of the machine to obtain the controlled and accurate dimensions and shapes required for the recesses may therefore be envisaged.

The machine is advantageously a milling machine. This type of machine, which is particularly suitable for machining a workpiece by removal of material, can be programmed to carry out a specific recess machining operation characterized by a depth of removal of material and a given section.

The peripheral recess is preferably likened to a groove reducing the section of the vane. In fact, the machining of the ends of each vane is intended to create, in conjunction with the corresponding ring, a peripheral groove once the vane has been correctly positioned on the deflector, so as to accommodate a weld bead therein. In accordance with a preferred embodiment of a method in accordance with the invention, each recess is produced in the distal part of each end of the vane. Each groove created in this way and intended to receive a weld bead is partly delimited by the vane and the ring.

Each vane preferably has a leading edge and a trailing edge, the recess extending around the vane excluding the trailing edge. In fact, the section of a blade may be likened to a water droplet, having a wide and rounded area, representing the leading edge, and a thin tapered area, representing the trailing edge. The trailing edge therefore being very thin, it is not recommended to machine it to reduce its thickness further, as this could risk piercing it and rendering it unusable.

The peripheral recess is advantageously of constant section around the vane. This configuration has the two-fold advantage of simplifying machining, by fixing the operating parameters of the machine tool from the start of the machining operation and in a manner that is constant over time, and also of enabling homogeneous deposition of the weld bead, without having to modify the dimensional characteristics of said deposited bead to adapt them to a recess of profiled section. A constant section of the recess is produced much more easily and more quickly using a preprogrammed automatic machine than by manual grinding.

The section of the recess advantageously has a first dimension that is a function of the predicted level of loading on the deflector in the operational configuration in the turbine and a second dimension that is a function of the accessibility of said recess to an operator carrying out the welding phase. In fact, the recess has a first dimension which corresponds to the depth of machining the vane and extends in a direction in which the section of said vane tends to decrease and a second dimension which extends in a direction parallel to an axis of the vane connecting its two ends, and that may be likened to its height. In this way, the recess is machined in depth to take account of the quantity of weld bead to be deposited, this quantity being a function of the predicted level of loading to which the deflector will be subjected in an operational situation. Accordingly, the greater the assumed loading, the greater the depth of the recess to be machined, in order to deposit therein a large quantity of weld bead. Similarly, it is machined to a minimum height, just sufficient for an operator to be easily able to deposit the weld bead in the recess, allowing for the presence of the contiguous vane, already welded to the two rings. It must in fact be pointed out that two consecutive vanes may overlap, leaving a narrow gap between them, making it difficult to deposit a weld bead in the whole of the groove of a vane when the adjacent vane has already been installed. The minimum height of the recess forming a groove is therefore determined to enable good access to said groove by an operator wishing to deposit a weld bead therein.

The ratio of the first dimension to the second dimension is preferably between 0.5 and 2. In this way, this ratio takes account both of the level of loading to which the deflector will be subjected in the internal body and the level of accessibility to the recess by an operator called on to deposit a weld bead.

The invention also relates to a vane intended for the fabrication of an internal body deflector of a low-pressure or medium-pressure module of a gas turbine by the method in accordance with the invention. The principal feature of a vane in accordance with the invention is that its two ends are machined by means of an automatic machine.

The method in accordance with the invention for fabricating a deflector has the advantage of saving significant time at the level of the phase of machining the vanes by carrying out this operation automatically, whereas existing methods involve manual machining of these vanes by an operator. It moreover has the advantage of being reliable, reproducible and accurate, which are particularly valuable qualities when the machining operation must be repeated on a large number of parts.

A detailed description of a preferred embodiment of a method in accordance with the invention for fabricating a deflector is given hereinafter with reference to FIGS. 1 to 3b.

DETAILED DESCRIPTION

Figure 1:
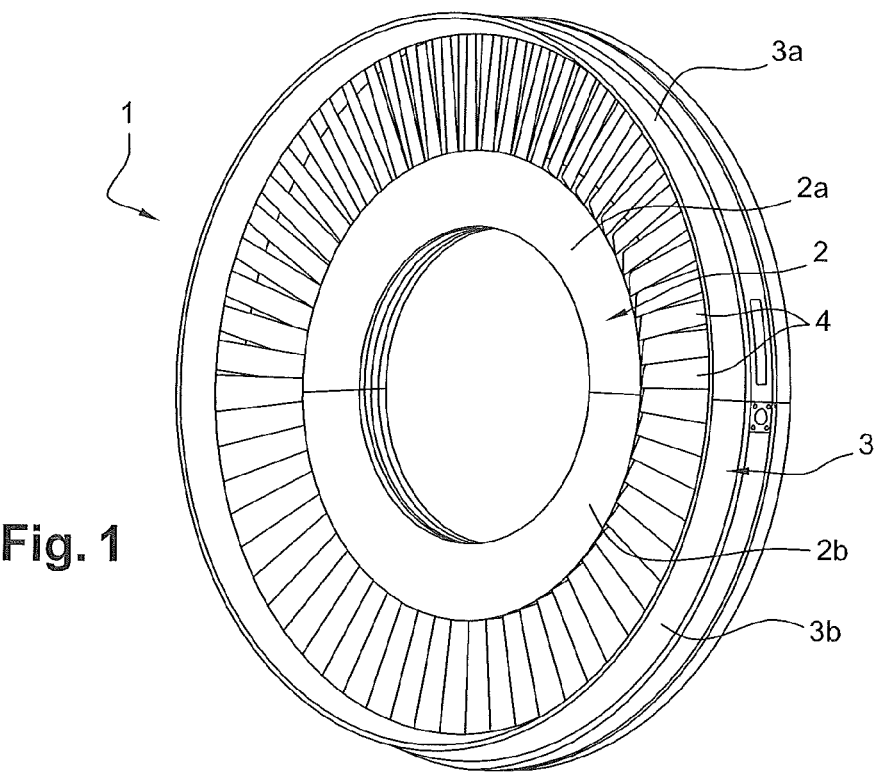
FIG. 1 is a perspective view of a deflector of an internal body of a medium-pressure or low-pressure module of a gas turbine.

Referring to FIG. 1, an internal body deflector 1 of a low-pressure or medium-pressure module of a gas turbine is generally made up of an annular internal ring 2 and an annular external ring 3, said rings being concentric. Each ring has a first part 2a, 3a that is bolted onto a second part 2b, 3b, said first and second parts being identical. The space situated between the two rings 2, 3 is occupied by a plurality of identical vanes 4, two contiguous vanes 4 overlapping, leaving between them a passage that is oblique with respect to the general surface plane of the deflector. These passages produced between two successive vanes 4 have the function of optimized orientation and acceleration of the streams of gas toward the mobile blades of the rotor.

Figure 2:
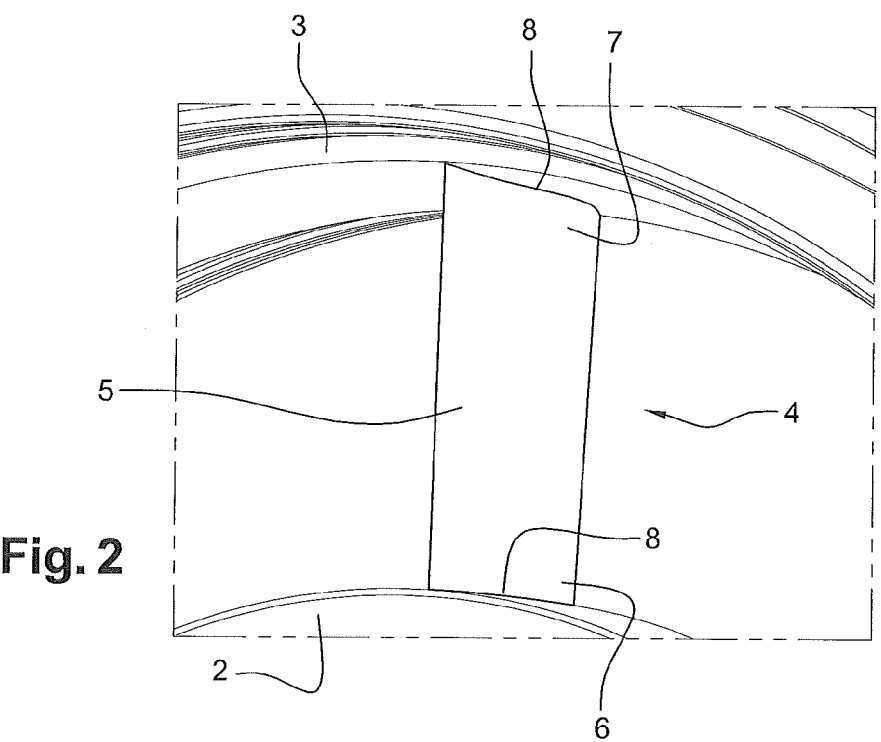
FIG. 2 is a perspective view to a larger scale of a vane fixed by welding to a deflector.

Referring to FIG. 2, a vane 4 takes the form of an elongate body 5 enabling a first end 6 brought into contact with the internal ring 2 to be distinguished from a second end 7 brought into contact with the external ring 3, these ends 6, 7 being connected to their respective ring 2, 3 by welding by means of a weld bead 8 deposited around said ends 6, 7 and against each of said rings 2, 3. In this way, each vane 4 constituting the deflector 1 is welded both to the internal ring 2 and to the external ring 3.

Figure 3A:
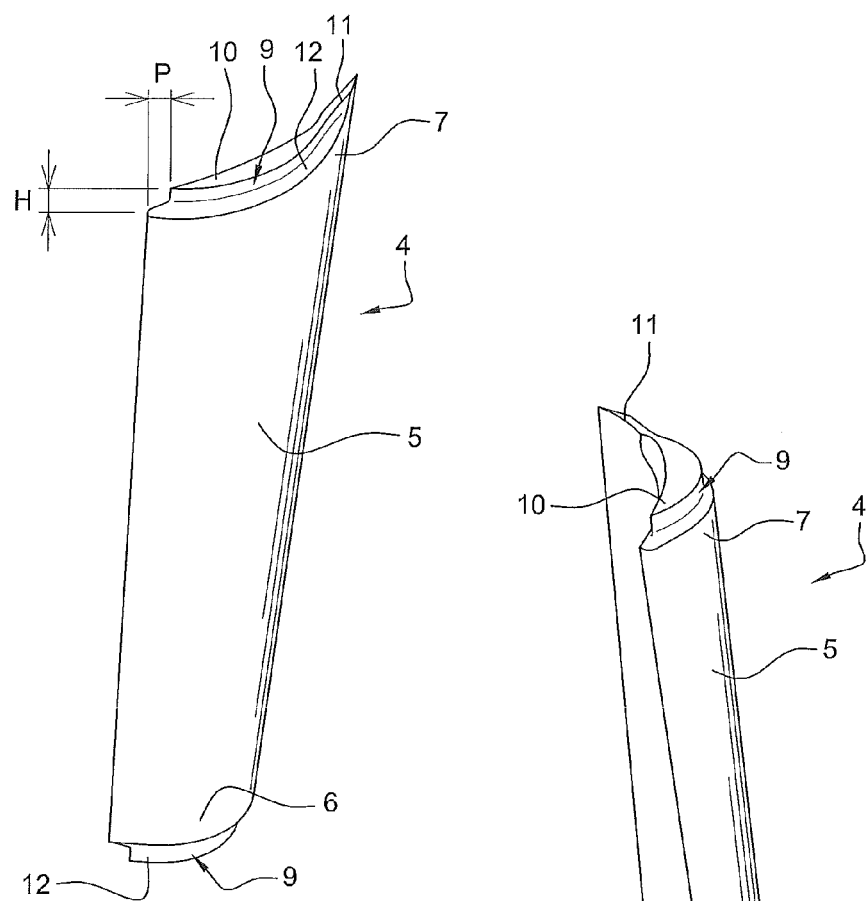
FIG. 3a is a perspective view of a vane in accordance with the invention.
Figure 3B:
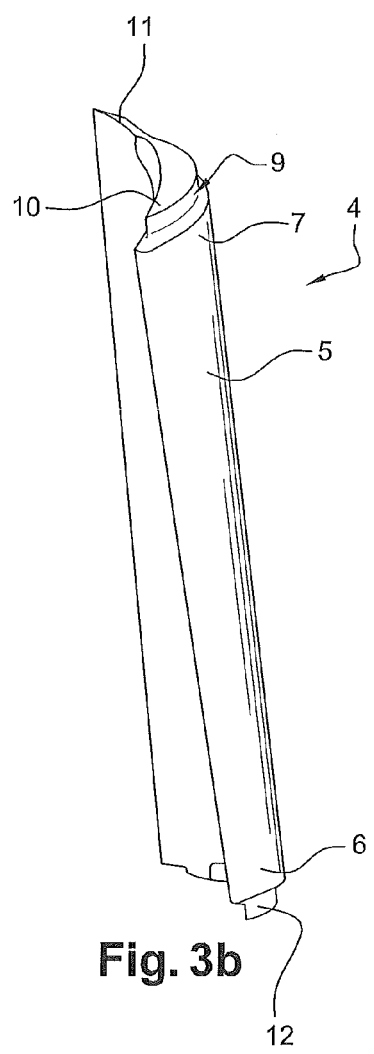
FIG. 3b is a perspective view of the vane from FIG. 3a seen from a different angle.

Referring to FIGS. 3a and 3b, each vane 4 is machined at each of its two ends 6, 7 so as to create with the ring 2, 3 against which it is in contact a groove 9 that is intended to accommodate a weld bead 8. Each vane 4 has a section substantially in the shape of a water droplet, having a rounded and enlarged shape corresponding to the leading edge 10 and a thin tapered part corresponding to the trailing edge 11. The distal part of each end 6, 7 of the vane 4 is machined to create a peripheral recess 12 around the whole of the section of said vane 4 except at the level of the trailing edge 11, the small thickness of which prohibits any additional thinning by machining, as this could risk perforating said edge 11 and rendering the vane 4 useless. The recess 12, which is identical at each end of a vane 4, is produced by removal of material from said vane 4 by means of a milling machine. Each recess 12 is characterized by a first dimension P that can be likened to the depth of removal of material from the vane 4 and extends in a direction in which the section of said vane 4 tends to decrease and a second dimension H that extends in a direction parallel to an axis of the vane 4, here a longitudinal axis, connecting the two ends 6, 7 at which the recesses 12 are produced, and can be likened to its height. The depth P of machining the recess 12 makes it possible to determine the maximum quantity of weld bead that it is possible to insert into the groove 9 situated around the vane 4 and is determined as a function of the predicted level of loading that will be exerted on the deflector 1 in an operational situation in the internal body. The higher the evaluated loading, the greater the quantity of weld bead 8 that it is recommended to insert into the groove 19 in order to reinforce the attachment of the vanes 4 to the rings 6, 7. The height H of the recess is dictated by the accessibility of a groove 19 to an operator to deposit a weld bead 8 therein when the contiguous vane 4 has already been welded to the deflector 1. In fact, two successive vanes 4 are placed very close to each other, to the extent that they may overlap, leaving only a narrow gap between them. A vane 4 already fixed to the deflector 1 must therefore not prevent the proper deposition of the weld bead 8 in the groove 9 of the adjacent vane 4, which still has to be welded. This height H is therefore determined as a function of the size and the geometry of the vanes 4 to be fixed to the deflector 1 and their intended spacing.

The method in accordance with the invention of fabricating an internal body deflector 1 of a low-pressure or medium-pressure module of a gas turbine comprises the following steps:

- as a function of the predicted level of loading that will be exerted on the deflector 1 in an operational situation and as a function of the size and the shape of the vanes 4 to be welded to the deflector 1 and their intended spacing, a recess 12 of given height H and given depth P is produced by automatic machining at the two ends 6, 7 of each vane 4,
- a first vane is pre-positioned on the deflector 1 at a clearly identified location between the two rings 2, 3 by means of a few spot welds at the ends 6, 7 of the vane 4,
- a weld bead 8 is then placed in one of the two grooves 9 to weld the end 6, 7 concerned to the corresponding ring 2, 3,
- another weld bead 8 is then deposited in the other groove 9 to weld the other end 6, 7 to the other ring 2, 3,
- when the first vane 4 has been welded to the deflector 1, the operation is repeated with a second vane 4, placed immediately alongside the first vane 4, and then progressively with all the other vanes 4 remaining to be fixed.

The invention claimed is:

1. A method of fabricating a deflector of a low-pressure or medium pressure module of a steam turbine, said deflector including an internal ring, an external ring and vanes, said method comprising:

automatic machining of ends of each vane in order to produce a peripheral recess around each of said ends, wherein the peripheral recess around each of said ends is machined to create a groove located between the peripheral recess and the corresponding internal or external ring, each groove being able to accommodate a weld bead; and depositing the weld bead in each groove to weld each of said ends of the respective vane to the corresponding internal or external ring.

2. The method as claimed in claim 1, wherein the machining step is effected by means of a machine designed to produce the recesses by removal of material.

3. The method as claimed in claim 2, wherein the machine is a milling machine.

4. The method as claimed in claim 1, wherein each vane has a leading edge and a trailing edge and the peripheral recess extends around the vane excluding the trailing edge.

5. The method as claimed in claim 1, wherein the peripheral recess is of constant section around the vane.

6. The method as claimed in claim 5, wherein the constant section of the peripheral recess has a first dimension P that is a function of the predicted level of loading on the deflector in the operational configuration in the steam turbine and a second dimension H that is a function of the accessibility of said peripheral recess to an operator carrying out the welding phase.

7. The method as claimed in claim 6, wherein the ratio of the first dimension P to the second dimension H is between 0.5 and 2.

* * * * *